UNITED STATES PATENT OFFICE.

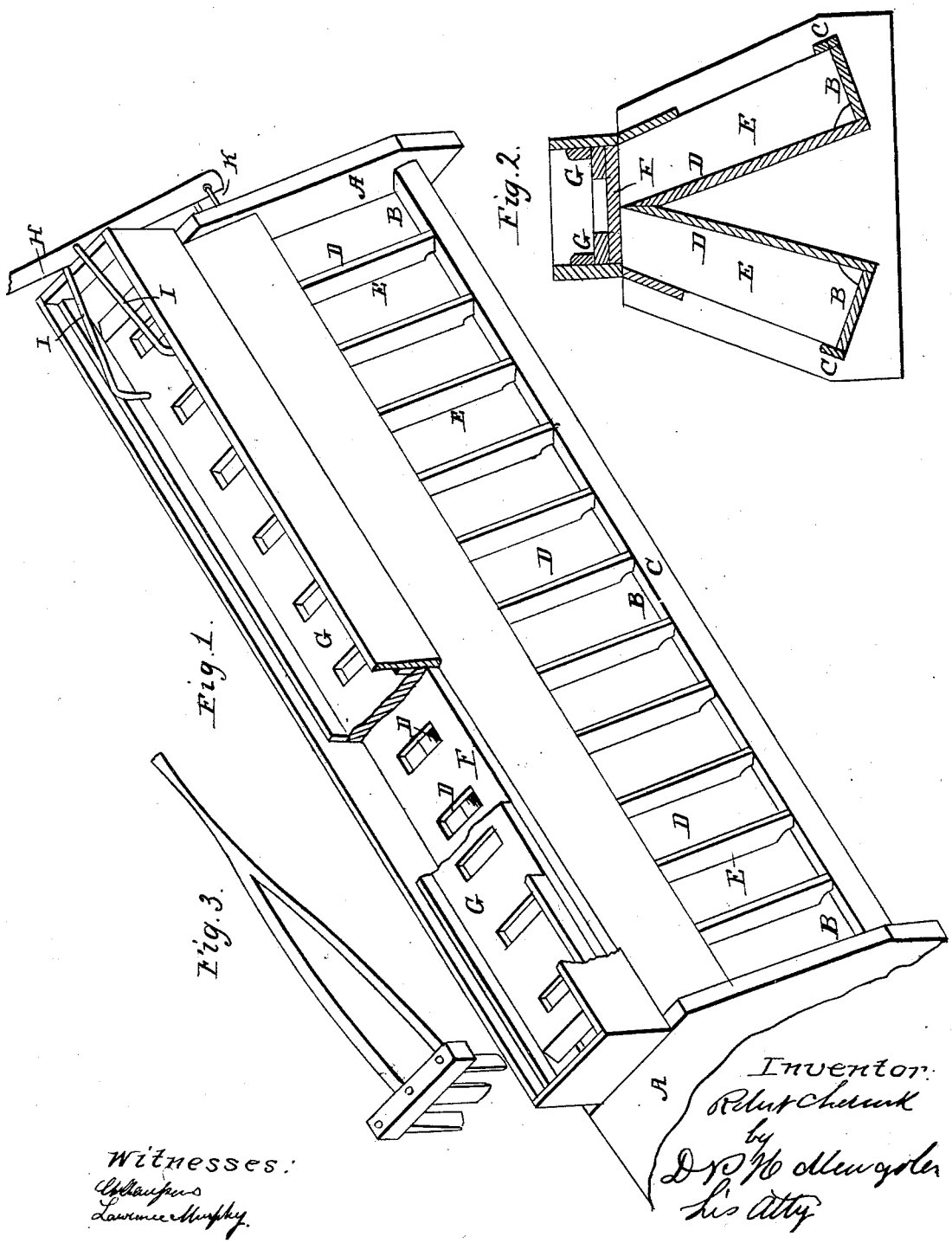

ROBERT CHESNUT, OF RICHMOND, INDIANA.

IMPROVEMENT IN FEEDING-TROUGHS.

Specification forming part of Letters Patent No. 57,477, dated August 28, 1866.

*To all whom it may concern:*

Be it known that I, ROBERT CHESNUT, of Richmond, in the county of Wayne and State of Indiana, have invented a new and useful Improvement in Feeding-Troughs; and I do hereby declare that the following is a full, clear, and exact description of the same, reference being had to the annexed drawings, made part of this specification, in which—

Figure 1 is a perspective view, and Fig. 2 is a vertical transverse section. Fig. 3 is a view of the rake.

The same letters refer to identical parts.

The trough for feeding hogs and other animals is supported upon frame-pieces A A, with the timbers B B uniting them. The latter pieces form the bottom of the trough, and are slightly inclined from front to rear. The front of the trough is formed by a board, C, set at right angles to the bottom, and the backs by the close partitions D.

The trough is divided into compartments by the vertical boards E, which are cut away at their lower rear corners, so as to permit the slops to flow freely from one part of the trough to another. The inclined backs from each side unite above midway of the width of the tank.

The floor of the tank F has openings through it over and leading into the several compartments, and the sides are carried up, so that the tank shall have any intended capacity.

The valve G is a board, with openings corresponding in number, size, and relative position to the board F. The valve G slides freely to and fro on the bottom board F, on which it fits snugly, and the supply of slops is regulated by its position in relation to the openings through the latter.

The sliding valve G is actuated by the lever H, which is attached to the valve by the rods I I and has its fulcrum at K.

Having fully described the construction of my improved feeding-trough, what I claim as my invention, and seek to secure by Letters Patent, is—

A feeding-trough, divided into a series of compartments communicating with one another, and so arranged as to receive the feed simultaneously from a tank located above the trough, the supply being regulated by a valve, G, actuated by a lever, H, the several parts being respectively constructed and arranged for use, substantially as set forth.

In testimony whereof I have signed my name to this specification in the presence of two subscribing witnesses.

ROBERT CHESNUT.

Witnesses:
 WM. A. BICKLE,
 C. W. SMITH.